Feb. 10, 1959  J. T. JOHNSON  2,872,818
LIQUID SAMPLING SYSTEM
Filed Sept. 2, 1955  2 Sheets-Sheet 1
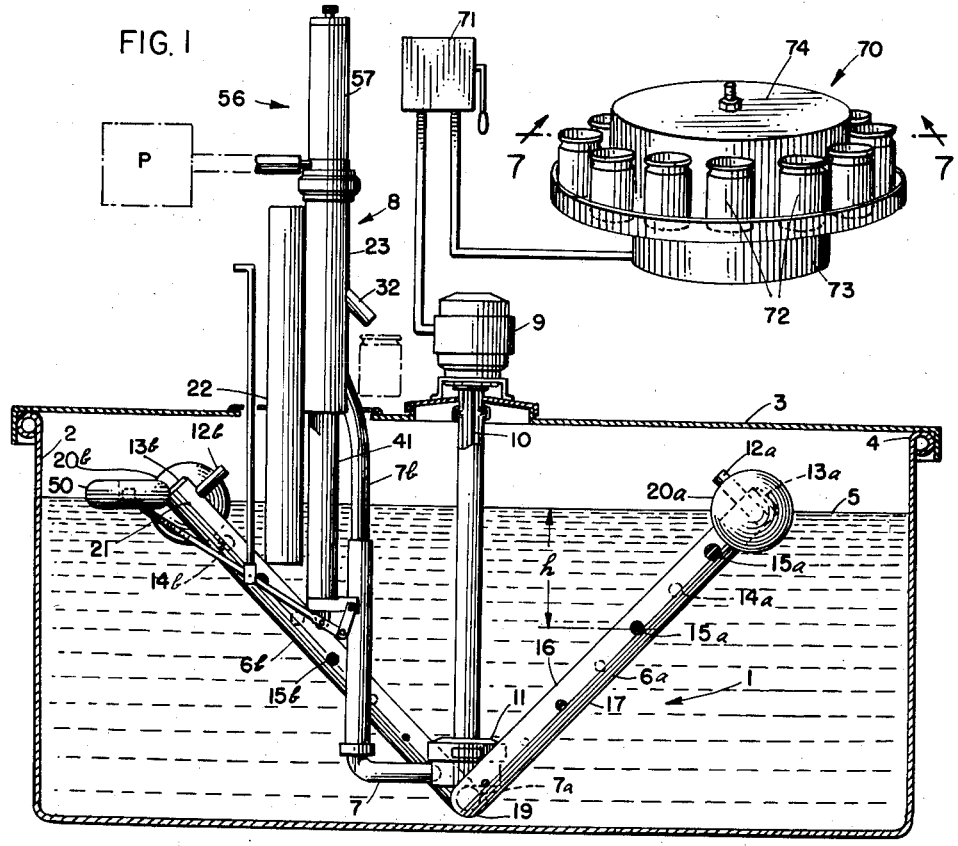
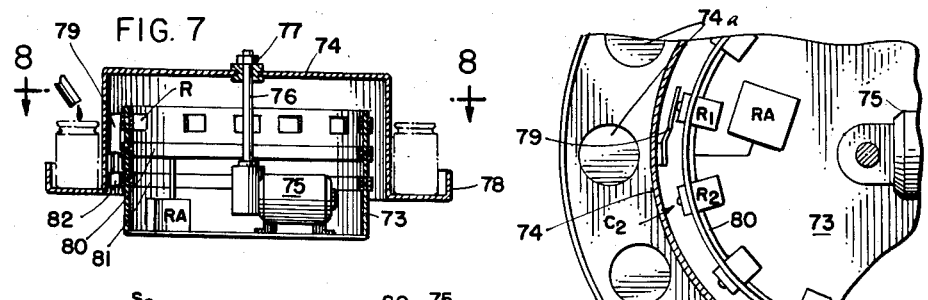
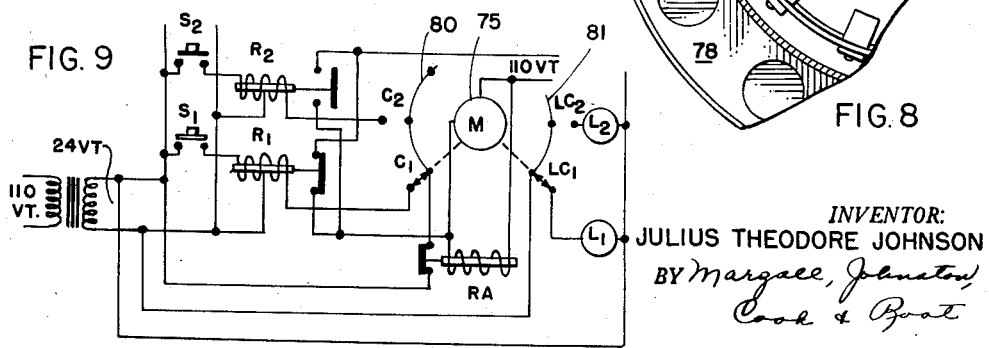
INVENTOR:
JULIUS THEODORE JOHNSON
BY Margell, Johnston,
Cook & Root
ATT'YS

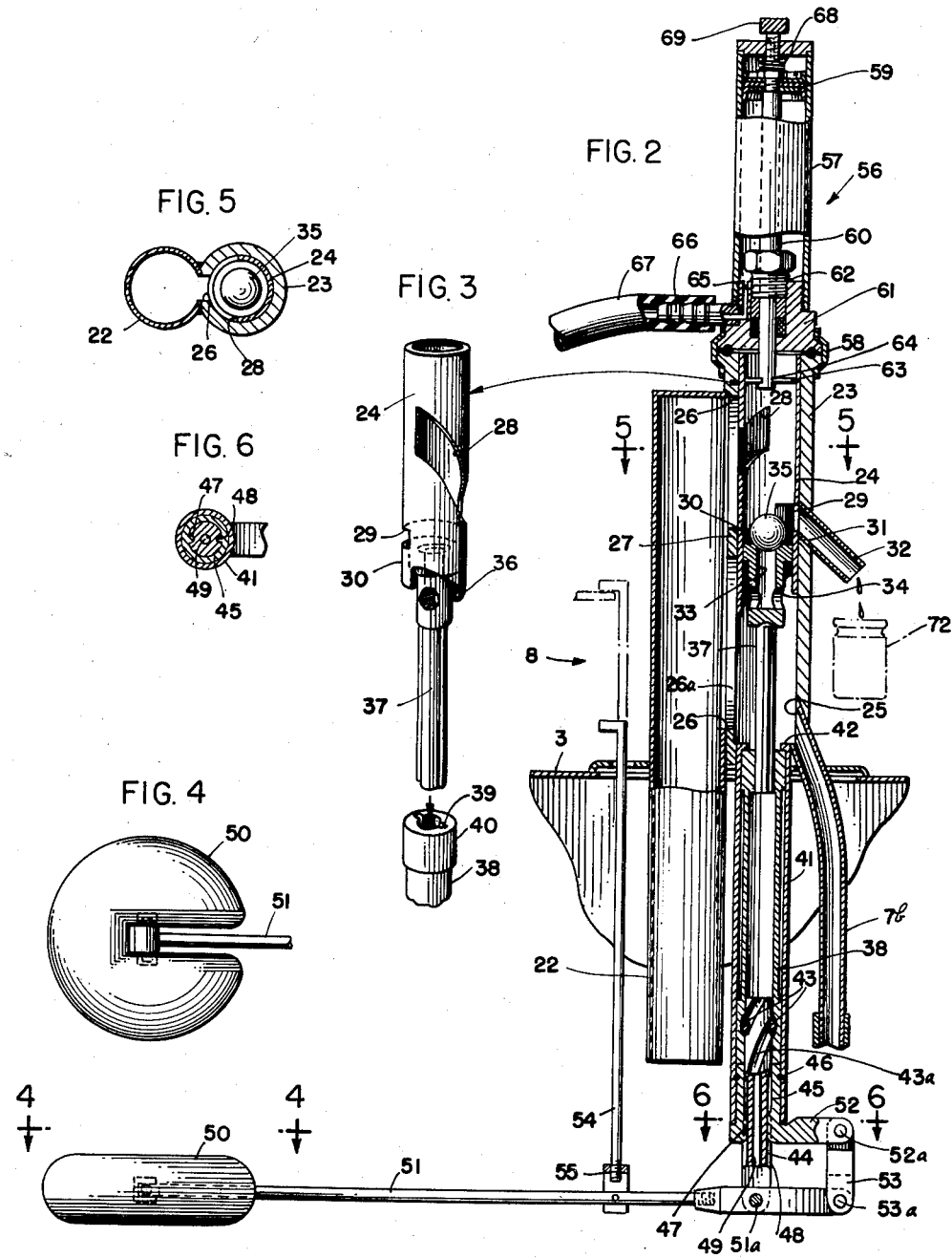

United States Patent Office 2,872,818
Patented Feb. 10, 1959

2,872,818

LIQUID SAMPLING SYSTEM

Julius Theodore Johnson, Clinton, Iowa

Application September 2, 1955, Serial No. 532,304

11 Claims. (Cl. 73—423)

This invention relates to a liquid sampling system and method, especially useful in sampling liquids which stratify. The invention is particularly advantageous in sampling milk, notably at the time the milk is received and during the weighing period.

This application is a continuation-in-part of my co-pending application, Serial No. 494,184, filed March 14, 1955, and the disclosure of the latter application is incorporated herein and made a part hereof by reference as fully as if it were set forth herein in its entirety.

Milk delivered to dairies is commonly poured from its containers into weigh tanks which collect the milk from one source for weighing, and a sample of each tankful is taken for the determination of butterfat content. It is highly desirable that the sample be as nearly representative as possible in order that accurate control may be maintained and so that the value of the milk, which depends upon the butterfat content, is correctly determined. At the same time, it is necessary that the sample be taken very quickly and not interfere with the receiving and processing operations, which take place at a rapid rate.

Since the determination of the fat content is based upon the analysis of a sample and the analysis is then converted to the fat content of the entire amount of milk sampled, it would be very advantageous if the sample taken were directly proportional to the amount present in the tank sampled. This quantity in the tank varies from lot to lot depending upon the amount of milk received. Also, each weight tank of milk is frequently not analyzed, but a composite sample representing a number of tank loads is prepared and analyzed. It is further desirable to collect samples in a composite sample over a period of time such as a week or a month, and to run one analysis for the entire quantity represented by the composite sample.

Previously, a number of devices and methods had been employed to sample the milk in the weight tank such as by removing a sample in the form of a vertical core from the tank or by employing relatively complicated and expensive sampling devices. These methods suffered from the disadvantage of excessive equipment cost for accurate sampling, or of excessive time consumption. In some cases, sampling is not as accurate as desired.

It is common practice to employ one or more persons to take a sample of each tank of milk received and to analyze each sample. The samples are not ordinarily proportional to the quantity in the tank. If a composite sample is desired, it is necessary to additionally measure an amount of each sample proportional to the amount of milk it represents, so that after a series of such sample portions are collected, the composite is directly proportional to the total amount of milk received and the analysis represents the correct average for the content of the entire amount. These operations require one or more persons in addition to the weigh tank operator who receives, weighs and dumps the milk and who has to correlate his operations with those of the sampler.

It is an object of the invention to overcome the disadvantages of the prior apparatus and methods in the provision of a new and improved liquid sampling system and method, involving the provision of new advantageous apparatus.

An important object is to provide a liquid sampling system adapted for one-man operation in semi-automatic manner. Particularly, the system may be operated by the weigh tank operator with no requirement for other personnel prior to actual analysis. Also, the analytical time is considerably reduced and analysis, calculations and records are greatly simplified. The weigh tank operator can operate the complete system by means of switches or valves without interference with his normal duties.

A particular object is to provide a liquid sampling system which provides for withdrawal of a representative portion from a column or quantity of liquid, removal of a sample from the withdrawn portion in an amount which is proportional to the total quantity of liquid sampled, and collection of each sample in a container predetermined or predesignated for the liquid from a given lot or producer.

Another object is to provide a simple, economical and reliable sampling system which can be completely mounted on a weight tank and which is available to and practical for small as well as large dairies and other users. The invention is especially advantageous for sampling all of the milk received at a dairy accurately and without interfering with normal operations or equipment.

A further object is to provide a liquid sampling and measuring valve for instantaneously sampling and removing a sample directly proportional to the quantity of liquid in a vessel.

An additional object is to provide a measuring valve in combination with means for adjusting the size of the sample taken dependent on the quantity of liquid being sampled. It is especially advantageous to provide a liquid level responsive device which automatically adjusts the valve to remove a proportionate sample.

Another object is to provide in a liquid sampling system, sample collecting means for collecting the samples in bottles or containers corresponding to the source of the liquid and which is particularly advantageous for semi-automatically collecting composite samples.

A further object is to provide a semi-automatic sample bottle selector or locator having a removable tray or container support for removing the containers of samples to storage or to testing, and for rapid replacement by another tray of containers.

Another object is to provide a combination with apparatus for removing a representative sample of liquid from a column thereof, in a suitable vessel, by withdrawing a plurality of small samples at a number of points distributed over the liquid column, particularly at vertically spaced points to obtain samples at the several layers or strata. This is especially important in the sampling of milk, since the milk tends to stratify rapidly with the butterfat ascending.

Further objects include the provision of a sampling system wherein the total quantity of the liquid always remains on the scale without affecting the weighing operation, wherein a representative sample is withdrawn at any liquid level in the weigh tank with no need for alteration or adjustment of the apparatus, and wherein the equipment continuously cleanses itself.

An additional object is to provide a method for accurately sampling and collecting the samples which reduces the manpower requirements and is rapidly and reliably carried out.

These and other objects, advantages and functions of the invention will be apparent on reference to the specification and the attached drawings, in which like reference characters are employed in each of the views to designate like parts, and in which—

Fig. 1 is a side elevational and partly sectional view, with the sample bottle selector shown in perspective, of one embodiment of the liquid sampling system of the invention, the apparatus except the selector being mounted on a weight tank;

Fig. 2 is an enlarged elevational and partly sectional view of the sample removing apparatus including a sampling and measuring valve, and means for adjusting the valve responsive to the liquid level in the tank;

Fig. 3 is an enlarged perspective view of the measuring cup forming a part of the sampling and measuring valve;

Fig. 4 is a plan view of the float employed in one embodiment of the invention for adjusting the position of the measuring cup according to the liquid level, taken on line 4—4 of Fig. 2;

Fig. 5 is a sectional view of the sample removing apparatus, taken on line 5—5 of Fig. 2;

Fig. 6 is a sectional view of part of the valve rotating mechanism, taken on line 6—6 of Fig. 2;

Fig. 7 is a vertical sectional view of the selector, taken on line 7—7 of Fig. 1;

Fig. 8 is an enlarged partial horizontal sectional view of the selector taken on line 8—8 of Fig. 7; and Fig. 9 is a partial wiring diagram for the selector.

The invention resides in the new construction, in the combination and arrangement of the elements thereof in a liquid sampling system, and in particular in the combination of means providing simple, rapid and accurate sampling and sample collecting. A new method for obtaining, measuring and collecting a truly representative sample from a body of liquid is provided, especially useful in dairy operations.

The liquid sampling system of the invention includes a combination of means for withdrawing a representative portion from a column of liquid, valve means for sampling the withdrawn portion in an amount proportional to the total quantity of liquid, and means for collecting each sample in a predetermined container. The system is semi-automatic and adapted for remote one-man operation.

A very advantageous component of the sampling system is a liquid sampling and measuring valve including a chamber having an overflow opening, and a measuring cup movable therein, the cup being constructed for cooperation with the overflow opening to vary the capacity of the cup. The chamber and the cup have sample outlets for register with each other to discharge the sample to a sample bottle or container preferably on a sample bottle locator or selector associated with the valve. Means are preferably provided for moving the cup relative to the chamber to vary its capacity, dependent on the quantity of liquid being sampled. The valve is especially adapted for being arranged vertically and connected to a liquid conduit. The valve may be continuously flushed and will withdraw an accurate sample instantaneously with the liquid by-passing the measuring cup when the sample is taken. The valve is preferably connected to a liquid level responsive device operating in the liquid tank or vessel.

In the preferred form of the invention, a component of the sampling system is the construction for withdrawing portions at several points in the main body of the liquid as described and claimed more specifically in the above application. Other apparatus for withdrawing a representative portion from a quantity of liquid may be employed in the combination, but the apparatus illustrated is preferred as providing great accuracy and reliability.

The sample taking apparatus includes means for simultaneously admitting a plurality of liquid streams from a column of liquid to a liquid collector through a corresponding plurality of orifices spaced upwardly of the column, the orifices decreasing in area downwardly of the column, and means for removing the liquid from the collector. Preferably, the orifice area is inversely proportional to the square root of $2gh$, where $g$ is the acceleration due to gravity, and $h$ is the height of the liquid level above the orifice.

In an especially advantageous embodiment, the admitting means and liquid collector constitutes a sampler duct or tube provided with a plurality of longitudinally spaced apertures. The sampler duct is inserted in the liquid so that it extends substantially from top to bottom for collecting samples at points distributed vertically in the liquid. It is further preferred that the duct extend across the liquid, so that samples are also taken at spaced horizontal intervals. The duct is mounted for automatic movement or adjustment with a change in the level of the liquid, so that a representative sample is taken at all times. The sampler duct is connected at its lower end to a conveyor or drain duct, and means are provided for removing the liquid from the conveyor and sampler ducts at a rate substantially as great as it is admitted to the sampler duct. Preferably, means are provided for forcing the liquid collected through the conveyor duct and back to the liquid body or column, recycling the liquid. A sample for testing is removed from the conveyor duct, preferably in instantaneous fashion by means of apparatus constructed for such removal.

Referring to the drawings, Fig. 1 illustrates a liquid sampling system which includes as its major components sample taking apparatus, sample removing apparatus and a selective sample collector. The sample taking apparatus is generally indicated by the numeral 1 and is mounted on a milk weigh tank, vessel or container 2, the apparatus being supported by a suitable cover, plate or member 3 which is in turn seated on the rim 4 at the top of the weigh tank. The weigh tank is illustrated as being filled with a liquid such as milk up to a level 5, which was reached, for example, in dumping the contents of a number of cans of milk from one farmer into the tank for weighing. This level will vary with the size of each lot of milk, and the sampling apparatus is adapted to take a representative sample whatever the liquid level may be.

The sample taking or withdrawing apparatus 1 includes a pair of like upwardly directed sampler ducts, tubes or conduits 6a and 6b which are connected to a conveyor duct, tube or conduit 7, to which is connected sample removing means or apparatus 8. Means for removing the liquid from the sampler ducts or arms 6a and 6b and conveying or forcing it through the conveyor duct 7 are provided in the form of a liquid pumping apparatus including a motor 9 which drives an impeller (not shown) of a pump 11 by means of an impeller shaft 10.

The interior of each of sampler ducts 6a and 6b is open to the atmosphere at its upper end through a vent or breather tube 12a or 12b, which is open to the atmosphere at its free end and to the duct at the end fixed thereto. These openings are always kept above the liquid level 5. The upper ends of the sampler ducts are plugged with plugs or stoppers 13a and 13b, removable for inspecting and cleaning the ducts. Each sampler duct is longitudinally perforated at spaced intervals, having a series of equidistantly spaced orifices, apertures, holes or openings 14a and 15a, and 14b and 15b, respectively. In the embodiment shown, equidistant alternate openings 14a and 14b are provided in a row on one side of the wall of each duct, and equidistant alternate openings 15a and 15b are provided in a row on the opposite side. This construction serves to withdraw samples in both lateral directions and also at different elevations. Preferably, as shown, each sampler duct is inclined from the vertical so as to extend in the horizontal direction over a considerable portion of the length or breadth of the weigh tank 2. The sampler ducts 6a and 6b incline in opposite directions, and they are spaced laterally. In this manner, sample portions are withdrawn in different areas laterally, longitudinally, and vertically.

The orifices or aperatures 14a, 14b, 15a and 15b may be otherwise located in the wall of the sampler duct; for example, they may all be on one side, or they may be on the top surface 16 (duct 6a) or bottom surface 17 of the duct. In the embodiment illustrated, the bottom 17 of the duct is free of orifices, avoiding interference of the liquid draining down the duct with that entering through the orifices.

The orifices preferably decrease in area downwardly in proportion to the height $h$ of the liquid level 5 above the orifices. In order to obtain a representative sample, it is necessary that the volumetric rate of flow of the liquid withdrawn through the orifices be the same for each orifice. Since the liquid streams or jets discharge through the orifices against a lesser pressure, about atmospheric pressure, the orifices decrease in area downwardly to compensate for the increased hydrostatic pressure in a downward direction. Thus, the velocity of flow through each orifice is determined by the formula $\text{Vel.} = (2gh)^{1/2}$ wherein $g$ is the acceleration due to gravity, 32.16 feet per sec.$^2$, and $h$ is the height of the liquid level 5 above the orifice, as illustrated for one orifice in Fig. 1. The area is then inversely proportional to the square root of $2gh$.

The volumetric rate of flow of liquid through the sampling apparatus 1 is predetermined according to the requirements of the situation, as is the number of orifices required for good sampling. The volumetric rate of flow desired through each orifice is then determined by dividing the total volumetric flow by the total number of orifices. Letting V represent the volumetric rate of flow through each orifice, then $V = A(\text{Vel.}) = A(2gh)^{1/2}$, where $A$ is the area of a given orifice, and $h$ is the liquid level height for the orifice, as described above. The area for a particular orifice is then determined by solving the equation for A, so that the formula for the area is $$A = \frac{V}{(2gh)^{1/2}}$$

The area is determined for each orifice at a predetermined position of the sampler duct 6a or 6b, which would be the lowest or most nearly horizontal position of the duct normally encountered where the minimum desired value of V is calculated. The position of the sampler duct determines the value of $h$ for each orifice. In the embodiment shown, the sampler ducts 6a and 6b are duplicates, and they are mounted in the same manner. Their orifice sizes and spacings are duplicates, although they can be changed as long as each orifice gives the same volumetric flow rate therethrough at each liquid level.

The above formula by which the area is determined holds true whatever the position of the duct, so that the areas A need be calculated but once, for one position of the duct. The areas then provide equal volumetric rates of flow through the several orifices 14a, 14b, 15a and 15b in each of the several positions of the duct. However, the flow through each orifice and the total flow is greater at the higher elevations corresponding to higher liquid levels 5 than at lower elevations and liquid levels.

Due to losses at the orifices, the volumetric rate of flow V through each orifice is less than calculated by the formula, so that the values must be corrected. It has been found that in the apparatus employed for certain standard milk weighing and sampling operations, the correction factor for each orifice is substantially the same for orifices of the same shape. For example, it has been found that the volumetric rate of flow calculated by the formula is to be multiplied by a constant loss factor K of about 0.8 to obtain the actual flow, in the case of circular orifices dimensioned to provide about 1 cubic inch of milk through each orifice per second. Orifices or openings of other shapes might be employed, having regard to the above considerations and likewise experimentally determining the correction factor to be applied in the calculations.

A weigh tank 2 of representative size in the industry may hold about 500–700 pounds of milk. Each sampler duct or arm 6a or 6b may be, for example, about 18 inches long and have 7 circular orifices spaced at two inch intervals. The ducts are mounted so that the orifices are spaced equidistantly from the liquid level 5 to the bottom or floor 18 of the tank. As examples of the several values referred to above, when the uppermost orifice 15a is 1 inch below the liquid level 5 or $h=1$ inch, the velocity, Vel., through the orifice is about 27.8 inches per second. In order to obtain an actual volumetric flow rate V through this orifice of 0.8 cubic inch per second, V is divided by the loss factor, $K=0.8$, in the calculations, and the $$\text{Area } A = \frac{V}{K \times \text{Vel.}} = \frac{0.8}{0.8 \times 27.8} = 0.0360 \text{ square inch}$$

The diameter of the circular orifice is then 0.214″. Similarly, to give an actual flow of 0.8 cubic inch per second through the orifice, an orifice 2 inches below the liquid level would have a diameter of 0.18″. The total flow through 14 orifices would be $0.8 \times 14 = 11.2$ cubic inches per second.

If the calculation were based on a position of the duct 6a or 6b in which it was inclined from the vertical, elevating the duct would increase the vertical distance between the orifices and thus the values for $h$, so that the volumetric rate of flow through each orifice would be correspondingly greater. However, the new flow rate would be the same for each orifice. Similarly, lowering the duct, towards the horizontal position, would decrease individual flow rates but they would remain equal. In this manner, the diameters of the apertures or orifices are once determined, and the quantity of sample withdrawn through each orifice is the same for every orifice in each position of the duct, but the volume flow rates vary with the position of the duct.

The sampler ducts 6a and 6b are rotatably connected to a tubular manifold or header 7a of the conveyor duct 7. The sampler ducts terminate at their lower ends in elbows 19 which form swivel joints with the open manifold ends. In this manner the conveyor duct 7 and the sampler ducts 6a and 6b are rotatably or pivotally connected relative to each other, for free vertical rotation of the sampler ducts.

Instead of two sampler ducts, only one may be employed, if desired, or additional sampler ducts may be employed for more extensive sampling. They may extend in different directions and at different elevations, and they may have different arrangements of orifices.

A float 20a or 20b is rigidly connected to each sampler duct, to automatically position or locate the sampler duct with a change in the level of the surrounding liquid, the sampler duct rotating accordingly. The float maintains the sampler duct in position such that the open ends of the vent tubes 12a and 12b remain above the liquid level 5, and the orifices are spaced uniformly down the column or body of liquid. The floats are fixed to the sides of the respective sampler ducts so that one point 21 adjacent the upper end of each duct is always coincident with the liquid level or surface 5. In this manner, the uppermost orifice always retains its proper spacing from the liquid level.

The liquid in the tank, being milk in dairy operations, continuously flows through the orifices 14a, 14b, 15a and 15b in rapid jets or streams which impinge on the opposite side of the ducts and drain by gravity down the ducts, and into the manifold 7a of the conveyor duct 7. When the motor 9 is running, the impeller withdraws the milk from the bottom of the sampler ducts 6a and 6b and the manifold 7a, and pumps it through the riser 7b of conveyor duct 7, past the sample removing apparatus or take-off 8 and through the downspout 22 into the milk in the tank 2, recycling the milk.

The motor and pump have capacities greater than necessary to remove the milk from the sampler ducts 6a and 6b as rapidly as it will enter the sampler ducts through the orifices, and they are operated to remove the milk at a rate substantially as great as it enters the sampler ducts.

In this manner, a plurality of streams of milk corresponding to the number of orifices continuously enter the sampler ducts and descend in free fall or flow to the lowermost and submerged ends of the ducts, the ends toward which the orifices decrease in area. There is constantly entering the manifold 7a a representative mixture of milk which is immediately withdrawn, conveyed to the sample removing apparatus 8, and recycled. At any instant, milk is entering the sampler duct which is representative of the milk in the tank 2 at that time, and in a very small time interval thereafter, approaching instantaneously, that milk passes the sample removing attachment 8. At the same time, the system is continuously being flushed with fresh milk, and the milk immediately preceding the sample removed at the take-off 8 differs if at all but very slightly from the sample, so that the results are exceedingly accurate. Thus, the apparatus is in operation as milk is being dumped into the weigh tank 2. When charging is complete, the system has just been flushed with milk of the same or almost the same composition as the final composition, and a representative sample of the complete charge is obtained nearly instantaneously.

A novel and much improved feature of the invention resides in the construction and arrangement of the sample removing apparatus 8 and its combination with the conveyor duct 7. The conveyor duct or liquid conduit is joined at the riser 7b with the sample removing apparatus for continuous flushing of the apparatus with the liquid during operation. The apparatus is arranged to variably bypass part of the liquid flowing in the duct depending upon the liquid level in the tank 2, to provide even pumping and circulation of the liquid, and the apparatus is also constructed to completely bypass the measuring cup therein when a sample is being removed.

The sample removing apparatus 8 includes a rigidly vertically mounted valve chamber, casing tube or sleeve 23 which is connected at its base to the riser 7b of the conveyor duct. Rotatably and reciprocatably located for sliding movement therein is a piston-like measuring or proportionating cup, bucket, sampler or tube 24. The tubular valve chamber 23 is provided with a liquid inlet, hole or opening 25 where it joins the riser 7b, and it also has a vertical rectangular longitudinal overflow opening or slot 26 which is bisected by a reinforcing piece 27 performing no other function. The valve chamber 23 and the vertical slot 26 in its side are arranged for cooperation with a helical overflow opening, slot or cutout 28 in the side of the measuring cup 24. It will be noted that with rotation of the cup 24 relative to the chamber 23, there is a resulting passageway between the interior of the cup and the exterior of the chamber which varies in its elevation, so that the capacity of the cup is effectively altered by rotation. The lower portion 26a of the chamber longitudinal slot 26 also serves as a liquid bypass opening. While the described construction and arrangement is preferred, it will be apparent that the same result can be accomplished in other ways, such as by a helical slot in the side of the chamber and a rectangular slot in the side of the cup.

The sampling and measuring cup 24 is provided with a horizontal transverse sectional discharge outlet, opening or slot 29 at its base 30 and in the side of the cup opposite to the helical opening 28 for completely discharging the contents of the cup to a sample collector. The cup discharge outlet is arranged to register with a corresponding discharge outlet 31 in which is secured a discharge spout or tube 32, located in the side of the valve chamber 23 opposite to the overflow opening 26. These discharge outlets register when the measuring cup is in its upper discharge position as illustrated in Figure 2.

The filling position of the measuring cup 24 is its lowermost position in the chamber 23, where the chamber inlet opening 25 registers or communicates with a passageway or opening to the base of the measuring cup. The base 30 of the cup 24 is drilled centrally vertically to provide a longitudinal tubular opening or bore 33 which opens into or communicates with a transverse tubular bore 34 in the base. Liquid flows from the conveyor duct riser 7b into the base of the valve chamber 23, through the transverse opening 34, and through the longitudinal opening 33, elevating a ball check valve 35 seated in the base 30 of the cup, and which acts to close the cup inlet opening provided by base openings 33 and 34. The liquid entering the measuring cup 24 overflows through the cup overflow opening 28 and through the chamber overflow opening 26, and it then descends through the downspout, return tube or chamber 22 to the liquid in the tank 2.

The cup 24 is provided with a helical opening or cutout adjacent its base 30 and below the cup chamber for partially bypassing the cup which provides a corresponding bypass regulator or baffle 36 which determines the amount of liquid which will bypass the cup when in filling position and flow directly out of the valve chamber 23 through the lower portion 26a of the overflow opening 26 adjacent its lower end. The amount of bypass is thus, like the overflow level at the cup opening 28, determined by the rotation of the cup which is in turn determined by the liquid level 5 in the tank 2, as will be further described subsequently.

When the measuring cup 24 is in its upper discharge position, the ball check valve 35 sets on a corresponding curved inner surface on the base 30 of the cup, to close the vertical component 33 of the cup inlet opening, preventing drainage from the cup except through the discharge opening 29. The quantity and pressure of liquid entering the valve chamber 23 from the riser 7b is insufficient to elevate the check valve when the cup is in raised position, and the cup is completely bypassed through the lower portion 26a of the chamber slot 26.

Construction is provided for rotating the measuring cup 24 responsive to the level 5 of the liquid in the tank 2. A keyed vertical cylindrical rotating or turning shaft 37 is secured to the base 30 of the measuring cup and depends therefrom, and it is turned by a rotating cylinder, sleeve or tube 38 having a corresponding keyway 39 in an engaging upper head or end 40 thereof. The turning shaft 37 is vertically slidably reciprocatable through the head 40 of the rotating cylinder and therein. The rotating cylinder is encased in a tubular jacket or chamber 41 which is rigidly secured with the valve chamber 23 and the downspout 22 for rigid or fixed mounting on the cover 3 on the tank. The rotating cylinder jacket 41 is provided with an inwardly extending annular shoulder or stop 42 at its upper end for containing the rotating cylinder 38 therein against vertical movement.

On the inner surface of the rotating cylinder 38 are inwardly extending cam followers or ridges 43 which serve to rotate the rotating cylinder which in turn rotates the cup turning shaft 37. The cam followers engage helical grooves 43a in a vertically reciprocatable cylinder cam or screw member 44 which enters the rotating cylinder 38 from below. The cam 44 reciprocates in a guide member 45 having a corresponding vertical opening and which is fixedly connected to the enclosing or encasing chamber 41 by means of pins 46 extending through the walls of the chamber. The inner surface of the guide member 45 is provided with inwardly extending keys or ridges 47 which engage corresponding vertical grooves or keyways 48 on the outer surface of the cylinder cam 44. In this manner, the cam 44 reciprocates vertically without turning, and by engagement of the helical grooves 43a therein with the cam followers 43 on the rotating cylinder 38, the cam rotates the rotating cylinder, the turning shaft 37 and the cup 24. The cylinder cam has a central longitudinal hole 49 extending therethrough for draining any liquid and preventing liquid binding.

The cylinder cam 44 serving to rotate the measuring cup 24 is actuated by a liquid level responsive device which, in the embodiment shown, is a float 50. The float is centrally pivotally connected to and elevates or depresses a float arm or connection 51 which is pivotally connected to the bifurcated lower end of the cylinder cam 44 as by a pivot pin 51a for raising or lowering the cam. A fixed connection for the end of the float arm 51 opposite the float is provided by a laterally extending lug 52 forming a part of the guide member 45. A link 53 joins the lug 52 and the arm 51 by pivot pins 52a and 53a to provide free movement of the parts without jamming. By the described construction, the rotation of the measuring cup 24 relative to the valve chamber 23 is dependent upon the liquid level in the tank 2 through the agency of the float 50 which is operatively associated with, connected to, or in engagement with the cup and rotates it correspondingly. The rotary position of the measuring cup in turn determines the relationship of the cup overflow opening 28 to the valve chamber overflow opening 26 and the relationship of the cup by pass regulator 36 to the valve chamber overflow opening 26. The former relationship determines the cup capacity and renders it directly proportional to the quantity of liquid in the tank 2, so that the sample taken by the cup and discharged through the cup discharge opening 29 is always automatically directly proportional to the quantity of liquid. The latter relationship serves to maintain a constant back pressure on the pump 11 with variations in the liquid level, so that pumping stays even and smooth and is not complicated by the effects of variable back pressure, such as air binding. When the liquid level 5 is high, the bypass regulator permits a greater amount of liquid to bypass the measuring cup 24, and when the liquid level 5 is low, a lesser amount bypasses the cup and the back pressure is increased. The bypassing in the several rotary positions of the cup generally serves to reduce the resistance to flow, which is considerable through the cup, while yet providing a substantial flow through the cup when in filling position to constantly flush it with fresh portions of the liquid in the tank entering the sample ducts 6a and 6b.

A vertically extending lock bar or rod 54 is pivotally connected to the float arm 51 by means of a yoke 55. The lock bar extends above the tank cover 3, where it may be lifted to lock the float in an upper position as shown schematically in broken line. This construction is useful where the tank contains a very small amount of liquid which would not provide a sample of the desired quantity for analytical purposes. The sample then taken will correspond to a full measuring cup 24 and will in this case not be directly proportional to the quantity of liquid.

A component of the sample removing apparatus is a cup elevating mechanism or assembly 56 which includes a piston cylinder 57 vertically arranged on and secured at its base to the valve chamber 23. The piston cylinder is connected to the chamber by a clamp 58 which is readily removable for cleaning and inspection purposes. A piston 59 is contained within the cylinder for vertical longitudinal reciprocation, and it reciprocates a piston rod 60 correspondingly. The piston rod reciprocates through the fixed base 61 of the cylinder and through a threadedly engaged sleeve 62 located centrally of the base. The piston rod extends downwardly into the measuring cup 24, where it engages a bifurcated plate 63 secured to the inner wall of the cup, by means of a groove or recess 64 adjacent the lower end of the rod. In this manner, when the piston rod reciprocates vertically, the measuring cup 24 is likewise moved up and down from its filling position to its sample discharge position.

The piston 59 is actuated by pneumatic or hydraulic means indicated schematically by P in Figure 1. Preferably, compressed air is caused to enter a port 65 in the base 61 of the cylinder, to elevate the piston and the measuring cup. The port communicates with the pneumatic apparatus through a projecting nozzle 66 to which is secured a pressure tube 67, in the illustrative embodiment. On release of the pressure, a coil compression spring 68 disposed between the piston and the upper enclosed end of the cylinder acts to return the piston and the measuring cup to their normally lowered positions. An adjusting screw 69 projects through the upper end of the piston cylinder 57 for regulating the tension of the spring 68. In operation, the cup elevating mechanism 56 is actuated by the weigh tank operator, desirably at the same time and employing the same pneumatic means as are employed to dump the milk tank. Thus, by opening an air valve (not shown) with his foot, the operator both causes the tank to dump and at the same time, causes air to enter the piston cylinder 57 and take a substantially instantaneous sample, which is discharged through the valve chamber discharge spout 32.

A selective sample collector 70 is associated with the sample removing apparatus 8 and particularly with the valve discharge spout 32 for collecting the samples discharged from the measuring valve. The sample collector or sample bottle selector may be mounted with the remainder of the apparatus on the weigh tank or may be mounted independently from the side. It is located so that each of a series of sample bottles, containers or receptacles 72 carried by it may be positioned in turn beneath the discharge spout 32 for collecting a sample therefrom. As illustrated in Figure 1, the pump motor 9 and the sample collector 70 may be operated from a common junction box 71, i. e., the complete system is activated or energized at once merely by operating a switch. The only acts remaining to be done for sampling are actuation of the cup elevating mechanism 56 and location or spotting of the proper one of the sample bottles 72, as described hereinafter.

The sample collector 70 is composed of a fixed cylindrical base or tray holder or mount 73, and a cylindrically shaped sample bottle holder, tray or support 74 mounted to revolve around the base. A motor 75 (see Figure 7) is located within the base 73, and it drives a vertically arranged shaft 76 which is removably connected to the tray 74 for rotation thereof. A lock nut 77 is in threaded engagement with the shaft and is removable for placing the tray and the bottles thereon in storage or elsewhere, and for substituting a different tray of bottles if desired. The tray 74 and the base 75 may be marked for proper alignment of the two in assembling the collector. The bottles 72, which are marked to identify the milk supplier, are arranged on a circular outwardly extending shelf 78 for being located alternately beneath the valve chamber spout 32. The bottles are placed in predetermined marked positions on the shelf, such as in numbered recesses or seats 74a (Figure 8).

The selective sample collector 70 is operated by a series of switches and relays, diagrammatically illustrated in part in Figure 9 and also represented in Figures 7 and 8. There is one switch $S_1$, $S_2$, etc. for each bottle and bottle position on the shelf 78, and by closing the proper switch, a predetermined bottle corresponding to a given milk supplier is spotted beneath the discharge spout 32. When the desired bottle is located beneath the spout, a corresponding lamp $L_1$, $L_2$, etc. lights and stays lit to indicate that the bottle remains in proper position. The switches may be located in a keyboard arrangement in proximity to the weigh tank operator's station, as may the lamps. When a given producer is discharging his milk to the weigh tank 2, the tank operator closes the correct switch S, and the proper bottle is automatically spotted for taking a sample. This bottle ultimately may contain a number of samples taken from a number of tankloads from the same supplier, each sample being directly proportional to the contents of the tank sampled, so that the bottle automatically contains a representative composite sample of the entire amount delivered and sampled.

The sample collector 70 is operated by the motor 75 in conjunction with a series of relays $R_1$, $R_2$, etc., switches and contact points. For example, referring to Figure 9, when normally open switch $S_1$ is closed momentarily, the switch of relay $R_1$, being a 2-coil solenoid-operated switch, closes and remains closed. Current from a 110 volt source of power then flows through a normally open 1-coil solenoid-operated switch identified as RA in the drawings, and closes the switch, as illustrated in the drawing.

Current also flows in parallel through the motor 75 which rotates the tray 74. In rotating, a number of contact pairs $C_1$, $C_2$, etc., disposed around the outer surface of the side of the base 73 are closed or bridged alternately by a leaf spring conductor 79 secured to the inner wall of the tray 74. Each pair of contact points, such as $C_1$, includes a contact point for one relay such as $R_1$ and a contact point connected to a source of current through relay RA. The switches S, the relays R and their contact points of the contact pairs C are connected in parallel. The contact points of the contact pairs C corresponding to the relay RA are connected in series by means of a conductor 80, for example. When the leaf conductor 79 bridges the contact points $C_1$, the circuit to the second coil in the relay $R_1$ is closed (the circuit to the first coil then being open due to return of $S_1$ to normally open position), and this causes the $R_1$ relay switch to open, breaking the circuits to the motor 75 and the relay RA, so that current no longer flows in the system.

It will be noted that the purpose of the normally open 1-coil relay RA is to maintain the circuit to the second coil of the 2-coil relay $R_1$ closed long enough for its switch to be opened, immediately after which the switch of the relay RA opens and breaks the circuit to the second coil of relay $R_1$, the current flow to the relay RA having stopped due to opening of the switch of relay $R_1$.

Circuit breaker means are thus provided for stopping the motor when the tray 74 has reached a predetermined position with a predetermined bottle 72 beneath the discharge spout 32, and further, for completely discontinuing electric current flow in the system, except for the current flowing to the lamp $L_1$ through the bridged contact pair $LC_1$.

The lamps L corresponding to the several bottles and relays R are likewise connected in parallel, with one common conductor furnishing one of each set of contact points LC, illustrated at 81 in Figure 7. The remaining contact points corresponding to the individual lamps are not shown therein, but are located like the relays R, around the outer surface of the side of the base 73. The circuit between each of the latter points and the common conductor 81 may also be closed by a leaf spring type conductor 82 secured to the inner surface of the side of the sample bottle tray 74. Current flows continuously to the lamp corresponding to the bottle spotted, so long as the bottle remains in its proper location.

In the construction and arrangement of the components of the sample collector 70 and its electrical actuating means, the switches S and the lamps L are preferably located in proximity to the tank operator, as aforesaid, the 2-coil relays R, the relay contact pairs C, and the lamp contact pairs LC corresponding to the several bottles and bottle positions are disposed in fixed positions around the side of the fixed base 73, and the 1-coil relay RA is located within the base.

Summarizing the operation of the liquid sampling system, when milk is being dumped into the weigh tank 2, the tank operator closes the switch in junction box 71 to make current available for operation of the sample collector 70 and to energize the pump motor 9. A representative portion of milk is continuously withdrawn from the tank through the orifices 14a and 15a, and 14b and 15b, in the sampler ducts 6a and 6b, and the pump 11 continuously circulates the milk through the liquid conduit 7 to the sample removing apparatus 8 and back to the tank through the downspout 22. The operator closes a switch S corresponding to the source of the milk, and the proper sample bottle 72 is spotted beneath the valve chamber discharge spout 32. When all of the milk has been poured into the tank, the operator actuates an air valve which dumps the tank and actuates the cup elevating mechanism 56 to raise the measuring cup 24 and take a sample. The floats 20a and 20b regulate the positions of the sampler ducts 6a and 6b, and with the described arrangement of the orifices in the ducts, a truly representative portion of liquid is withdrawn. Through the agency of the valve adjusting or cup rotating float 50, the sample removed from the representative mixture flowing in liquid conduit 7 is directly proportional to the quantity of liquid. This representative proportionate sample discharges from the valve chamber spout 32 into the proper bottle 72, to complete the sampling operation. When the tank is empty, fresh milk is charged and the operation is repeated, spotting the appropriate sample bottle 72 beneath the valve chamber spout 32. Any number of samples can thus be taken from a number of tank loads from the same supplier or from a number of suppliers. The sample bottles are removed periodically for analysis of the composites.

It will be apparent that numerous changes can be made in the construction and arrangement of the components of the new liquid sampling system while achieving its objects and without departing from the spirit and scope of the invention. Thus, for example, instead of being tubular as illustrated, the ducts may take other forms, such as square. The orifices may be other than circular, although this is preferred. Other means or arrangements may be substituted for withdrawing the liquid from the sampler ducts. The components of the sampling and measuring valve may be constructed and arranged differently, as in the location and contour of their several openings or in other manner of relative movement. Other arrangements, such as a gear train, may be employed for rotating the measuring cup 24 responsive to movement of the float 50 with a change in the liquid level. The selective sample collector may be arranged and operated in other ways within the purview of the invention while accomplishing the same objects.

A new liquid sampling system and method are thus furnished which constitute significant improvements, especially in sampling milk in a dairy. A simple and yet very efficient sanitary construction is provided which furnishes a very uniform and truly representative sample substantially instantaneously. The sample is automatically proportional to the quantity sampled. The entire operation can be carried out by one man, and that man can be the person already employed as the weigh tank operator with no interference with his normal duties. There is no loss of time, and the operation is semi-automatic and requires no additional labor or supervision. The subsequent analytical procedures, calculations and records are also greatly simplified. The entire quantity of milk is always kept on the weighing scale, so that the weight noted is correct without further adjustment. The apparatus is economical and portable in nature, which renders it attractive to the user, especially to small dairies which must operate with limited capital investment and labor. The system is equally useful whether it is desired to analyze samples daily, weekly, monthly or at any other interval, and it enables the dairy to sample every tankful received, which has not always been the case in practice. The sampling system provides rapid and accurate analysis of the milk, so that the dairyman and the farmer know the correct value of the milk, and the dairyman is enabled to keep a correct account of the milk especially as regards the butterfat content.

The invention is hereby claimed as follows:

1. A liquid sampling and measuring valve comprising a chamber having an overflow opening and a sample outlet therein, and a relatively movable measuring cup therein having a sample outlet for communication with said chamber sample outlet, said cup being relatively movable from a filling position with the respective said sample outlets out of communication to a discharge position with the outlets in communication, said cup being constructed for cooperation with said overflow opening to vary the cup capacity dependent on the relative position of the cup.

2. A liquid sampling and measuring valve comprising a chamber having an overflow opening and a sample outlet therein, and a relatively rotatable cup therein having a sample outlet for register with said chamber sample outlet, said cup being relatively movable from a filling position with the respective said sample outlets out of register to a discharge position with the outlets in register, said cup having a side opening for cooperation with said overflow opening to provide a variable cup capacity dependent on the relative rotation thereof.

3. A liquid sampling and measuring valve comprising a chamber having an overflow opening and a sample outlet therein, and a relatively rotatable cup therein having a sample outlet for register with said chamber sample outlet, said cup having a side opening for cooperation with said overflow opening to provide a variable cup capacity dependent on the relative rotation thereof and being reciprocable relative to said chamber from a filling position with the respective said sample outlets out of register to a discharge position with the outlets in register.

4. A liquid sampling and measuring valve comprising a chamber having an overflow opening and a sample outlet therein, a relatively rotatable cup therein having a sample outlet for register with said chamber sample outlet, said cup having a side opening for cooperation with said overflow opening to provide a variable cup capacity dependent on the relative rotation thereof and being reciprocable relative to said chamber from a filling position with the respective said sample outlets out of register to a discharge position with the outlets in register, means for supplying liquid within said cup adjacent its base when in filling position, and means for partially bypassing the cup when in filling position.

5. A liquid sampling and measuring valve comprising a chamber having an overflow opening and a sample outlet therein, a relatively rotatable cup therein having a sample outlet for register with said chamber sample outlet, said cup having a side opening for cooperation with said overflow opening to provide a variable cup capacity dependent on the relative rotation thereof, means for supplying liquid to said cup when in filling position, means for variably partially bypassing said cup when in filling position dependent on the relative rotation thereof, and means for relatively rotating said cup dependent on the quantity of liquid being sampled to adjust the cup capacity and the amount of bypass correspondingly.

6. A liquid sampling and measuring valve comprising a slotted chamber having a liquid inlet and a sample outlet, a slotted measuring cup relatively rotatable and reciprocatable therein and having a liquid inlet adjacent its base and a sample outlet, the slots in said chamber and said cup being arranged for registering to provide a variable cup capacity dependent on the rotation of the cup with respect to the chamber, said cup being reciprocatable from a filling position with the respective said sample outlets out of register to a discharge position with the outlets in register, said cup being constructed adjacent its base for variably partially bypassing the cup dependent on the said rotation of the cup, and check valve means for closing said cup liquid inlet in said discharge position.

7. The combination in a liquid sampling apparatus comprising a liquid conduit, a vertically arranged valve connected thereto adjacent the base of the valve, a chamber forming part of said valve and connected to said conduit and having an overflow opening, a bypass opening and a sample outlet therein, and a measuring cup rotatable and reciprocatable therein and having a liquid inlet adjacent its base and a sample outlet, said cup being constructed for cooperation with said overflow opening to vary the cup capacity dependent on the rotation of the cup and being reciprocatable from a lower filling position with the respective said sample outlets out of register to an upper discharge position with the outlets in register, said valve being constructed for continuously flushing said cup with liquid flowing in said conduit when in filling position and for completely bypassing the cup when in discharge position.

8. The combination in a liquid sampling apparatus comprising a liquid conduit, a valve connected thereto, a chamber forming part of said valve and having an overflow opening, a measuring cup movable therein and being constructed for cooperation with said overflow opening to vary the cup capacity dependent on the position of the cup, and a liquid level responsive device operatively associated with said cup for movement thereof corresponding to the level of a liquid being sampled.

9. A liquid sampling and measuring valve comprising a chamber having an overflow opening and a sample outlet therein, and a relatively rotatable cup therein having a sample outlet for register with said chamber sample outlet, said cup having a side opening for cooperation with said overflow opening to provide a variable cup capacity dependent on the relative rotation thereof, and means for relatively rotating said cup dependent on the quantity of a liquid being sampled.

10. A liquid sampling and measuring valve comprising a chamber having a sample outlet therein, a relatively movable measuring cup therein having a sample outlet for communication with said chamber sample outlet, said cup being relatively movable from a filling position with the respective said sample outlets out of communication to a discharge position with the outlets in communication, and means for varying the cup capacity dependent on the quantity of a liquid being sampled.

11. Liquid sampling apparatus comprising a measuring cup, means for supplying a liquid being sampled to said cup, means for discharging a sample from said cup, means for varying the cup capacity to correspond to the quantity of a liquid being sampled, and means responsive to said liquid quantity for adjusting said cup capacity varying means.

References Cited in the file of this patent

UNITED STATES PATENTS

| | | |
|---|---|---|
| 669,347 | Quinn | Mar. 5, 1901 |
| 1,101,568 | Roberts | June 30, 1914 |
| 1,581,633 | Goetter | Apr. 20, 1926 |
| 2,158,803 | Renfro | May 16, 1939 |
| 2,177,477 | Dahlstrom | Oct. 24, 1939 |
| 2,240,888 | Hageline | May 6, 1941 |
| 2,604,248 | Gorham | July 22, 1952 |

FOREIGN PATENTS

| | | |
|---|---|---|
| 673,751 | Germany | Mar. 27, 1939 |